(12) United States Patent
Miyazaki et al.

(10) Patent No.: US 8,833,633 B2
(45) Date of Patent: Sep. 16, 2014

(54) ROTARY TOOL

(75) Inventors: Hiroka Miyazaki, Itami (JP); Hideki Moriguchi, Itami (JP); Yoshiharu Utsumi, Itami (JP); Hidetoshi Fujii, Suita (JP); Yoshiaki Morisada, Osaka (JP)

(73) Assignees: Sumitomo Electric Industries, Ltd., Osaka (JP); Osaka University, Osaka (JP); Osaka Municipal Technical Research Institute, Osaka (JP)

( * ) Notice: Subject to any disclaimer, the term of this patent is extended or adjusted under 35 U.S.C. 154(b) by 0 days.

(21) Appl. No.: 13/995,355

(22) PCT Filed: Dec. 14, 2011

(86) PCT No.: PCT/JP2011/078896
§ 371 (c)(1),
(2), (4) Date: Jun. 18, 2013

(87) PCT Pub. No.: WO2012/086489
PCT Pub. Date: Jun. 28, 2012

(65) Prior Publication Data
US 2013/0341376 A1   Dec. 26, 2013

(30) Foreign Application Priority Data
Dec. 22, 2010   (JP) ................................ 2010-285914

(51) Int. Cl.
*B23K 20/12*   (2006.01)

(52) U.S. Cl.
USPC ....................................... 228/2.1; 228/112.1

(58) Field of Classification Search
None
See application file for complete search history.

(56) References Cited

U.S. PATENT DOCUMENTS

| | | | |
|---|---|---|---|
| 5,697,994 A | 12/1997 | Packer et al. | |
| 6,187,421 B1 * | 2/2001 | Moriguchi et al. | 428/216 |
| 6,299,658 B1 * | 10/2001 | Moriguchi et al. | 51/307 |
| 2001/0038028 A1 | 11/2001 | Iwashita | |
| 2005/0126336 A1 | 6/2005 | Jansson et al. | |

(Continued)

FOREIGN PATENT DOCUMENTS

| | | | |
|---|---|---|---|
| EP | 2591874 A1 * | 5/2013 | |
| JP | 58-104174 | 6/1983 | |

(Continued)

OTHER PUBLICATIONS

PCBN Blank, China PCBN Blank Manufacturer, Laser Engraving Service, retrieved Feb. 13, 2014 <http://cuttingtoolchina.com/7-pcbn-blank.html>.

(Continued)

*Primary Examiner* — Kiley Stoner
(74) *Attorney, Agent, or Firm* — Venable LLP; Michael A. Sartori; F. Brock Riggs

(57) ABSTRACT

There is provided a tool for friction stir welding having excellent wear resistance and chipping resistance. The tool for friction stir welding according to the present invention is a tool for friction stir welding used in friction stir welding processing, wherein the tool for friction stir welding includes a base material, the base material includes a first hard phase and a binder phase, and has a thermal conductivity of 45 W/m·K or less, the first hard phase is formed by WC particles, and the binder phase is formed by an iron group metal and is included in the base material at a volume ratio of 8% by volume or more and 28% by volume or less.

7 Claims, 1 Drawing Sheet

(56) References Cited

U.S. PATENT DOCUMENTS

| | | | |
|---|---|---|---|
| 2006/0049234 A1 | 3/2006 | Flak et al. | |
| 2006/0079234 A1* | 4/2006 | Ishikawa | 455/436 |
| 2007/0119276 A1* | 5/2007 | Liu | 75/232 |
| 2007/0187465 A1* | 8/2007 | Eyre et al. | 228/101 |
| 2007/0196694 A1 | 8/2007 | Jansson et al. | |
| 2007/0241167 A1 | 10/2007 | Gendou et al. | |
| 2009/0260299 A1* | 10/2009 | Liu et al. | 51/309 |
| 2010/0038408 A1* | 2/2010 | Keshavan et al. | 228/112.1 |
| 2010/0038832 A1* | 2/2010 | Rosal et al. | 266/46 |
| 2010/0255264 A1* | 10/2010 | Ishida et al. | 428/172 |
| 2010/0258612 A1* | 10/2010 | Kolbeck et al. | 228/2.1 |
| 2010/0279146 A1* | 11/2010 | Rowe et al. | 428/650 |
| 2012/0186160 A1* | 7/2012 | Morisada et al. | 51/307 |
| 2012/0248175 A1* | 10/2012 | Moriguchi et al. | 228/112.1 |
| 2013/0000213 A1* | 1/2013 | Okamura et al. | 51/307 |
| 2013/0062395 A1* | 3/2013 | Nelson et al. | 228/2.1 |
| 2013/0087604 A1* | 4/2013 | Moriguchi et al. | 228/112.1 |

FOREIGN PATENT DOCUMENTS

| | | | |
|---|---|---|---|
| JP | 07-505090 | | 6/1995 |
| JP | 2001-314983 | | 11/2001 |
| JP | 2002-356734 | A | 12/2002 |
| JP | 2003-507578 | | 2/2003 |
| JP | 2003-326372 | A | 11/2003 |
| JP | 2004-195480 | | 7/2004 |
| JP | 2005-126824 | A | 5/2005 |
| JP | 2005-152909 | A | 6/2005 |
| JP | 2005-199281 | A | 7/2005 |
| JP | 2007-283324 | A | 11/2007 |
| JP | 2008-133509 | A * | 6/2008 |
| JP | 2009-543696 | | 12/2009 |
| JP | WO 2010/110197 | A * | 9/2010 |
| JP | 2011-062742 | A * | 3/2011 |
| WO | WO-93/10935 | | 6/1993 |
| WO | WO-96/36465 | A1 | 11/1996 |
| WO | WO-01/14608 | | 3/2001 |
| WO | WO-2007/089882 | | 8/2007 |
| WO | WO-2009/062216 | | 5/2009 |

OTHER PUBLICATIONS

Office Action in U.S. Appl. No. 13/995,386, dated Feb. 20, 2014.
Office Action in U.S. Appl. No. 13/995,321, dated Feb. 21, 2014.
Miyazaki et al., U.S. Appl. No. 13/995,321, "Rotary Tool," Filed Jun. 18, 2013.
Moriguchi et al., U.S. Appl. No. 13/995,386, "Rotary Tool," Filed Jun. 18, 2013.
International Search Report in PCT International Application No. PCT/JP2011/078895, dated Jan. 24, 2012.
International Search Report in PCT International Application No. PCT/JP2011/078896, dated Jan. 24, 2012.
International Search Report in PCT International Application No. PCT/JP2011/078897, dated Jan. 24, 2012.
Notice of Grounds of Rejection issued in Japanese Patent Application No. 2010-285953 dated Jun. 24, 2014.
Notice of Grounds of Rejection issued in Japanese Patent Application No. 2010-286003 dated Jun. 24, 2014.

* cited by examiner

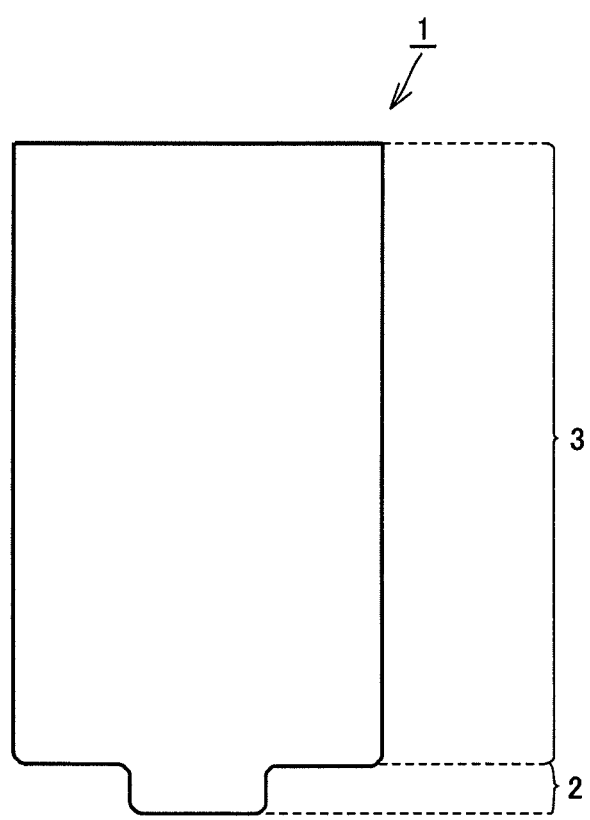

ROTARY TOOL

TECHNICAL FIELD

The present invention relates to a tool for friction stir welding.

BACKGROUND ART

In 1991, a friction stir welding technique of joining metal materials such as aluminum alloys was established in the United Kingdom. This technique is for joining metal materials by pressing a cylindrical tool for friction stir welding having a small-diameter protrusion at a tip thereof against joint surfaces of the metal materials to be joined and rotating the tool for friction stir welding, generating frictional heat, and softening and plastically flowing the metal materials at a joint portion by the frictional heat (Japanese National Patent Publication No. 07-505090 (PTL 3)).

"Joint portion" herein refers to a joint interface portion where joining of metal materials by butting the metal materials or placing one metal material on top of the other metal material is desired. In friction stir welding, the metal materials near this joint interface are softened, plastic flow occurs, and the metal materials are stirred. As a result, the joint interface disappears and joining is performed. Furthermore, dynamic recrystallization occurs at the metal materials at the same time. Due to this dynamic recrystallization, the metal materials near the joint interface become fine particles and the metal materials can be joined with high strength.

When aluminum alloys are used as the above-mentioned metal materials, plastic flow occurs at a relatively low temperature of approximately 500° C. Therefore, even when the tool for friction stir welding made of inexpensive tool steel is used, little wear and tear occurs and frequent replacement of the tool is unnecessary. Therefore, in the friction stir welding technique, the cost required to join the aluminum alloys is low. Thus, in place of a resistance welding method for melting and joining aluminum alloys, the friction stir welding technique has already been in practical use in various applications as a technique of joining components of a railroad vehicle, a vehicle or an aircraft.

At present, the friction stir welding technique is mainly applied to nonferrous metals such as an aluminum alloy, a magnesium alloy and a copper alloy in which plastic flow occurs at a relatively low temperature. This friction stir welding technique is superior to the resistance welding method in terms of cost and time required for joining, strength of the joint portion, and the like. Therefore, there is a need for applying the friction stir welding technique to not only joining of the materials in which plastic flow occurs at a low temperature, but also joining of steel materials in which plastic flow occurs at a high temperature of 1000° C. or higher. In the following, various processing using the friction stir welding technique will be referred to as friction stir welding.

However, in friction stir welding under high temperature, the temperature of the stirred portion rises to a temperature near the melting point of the materials to be joined. Therefore, during joining, the materials to be joined react with a base material of the tool for friction stir welding, and thus, alloying of the base material progresses or the components of the base material dissolve in the materials to be joined. As a result, wear tends to progress. Furthermore, chipping or breaking tends to occur at a probe portion of the tool for friction stir welding, and thus, shortening of the tool life is a serious problem.

Japanese Patent Laying-Open No. 2003-326372 (PTL 1) discloses a technique in which a portion of a surface of a tool for friction stir welding that is in contact with materials to be joined is coated with a diamond film, thereby increasing the surface hardness. In Japanese Patent Laying-Open No. 2001-314983 (PTL 2), cemented carbide or the like having a hardness higher than that of materials to be joined is used as a material for a tool for friction stir welding.

CITATION LIST

Patent Literature

PTL 1: Japanese Patent Laying-Open No. 2003-326372
PTL 2: Japanese Patent Laying-Open No. 2001-314983
PTL 3: Japanese National Patent Publication No. 07-505090

SUMMARY OF INVENTION

Technical Problem

However, both of the diamond film disclosed in PTL 1 and the cemented carbide disclosed in PTL 2 have an advantage of high material strength, while both of them have a high thermal conductivity. Therefore, frictional heat generated due to rotation of the tool for friction stir welding diffuses easily to the tool for friction stir welding side, and sufficient conduction of the frictional heat to the materials to be joined side becomes difficult. As a result, an enormous time is required from when the probe portion of the tool for friction stir welding is pressed against the materials to be joined to when plastic flow occurs.

In particular, in the case of joining of the materials in which plastic flow occurs at a high temperature, the tool for friction stir welding must be rotated at a high speed in order to speed up temperature rise of the materials to be joined. However, when the tool for friction stir welding has a high thermal conductivity, an enormous time is required before plastic flow of the materials to be joined occurs, and thus, it is impossible to fully enjoy an advantage of the friction stir welding technique (reduction in cost and time required for joining).

Especially when the friction stir welding technique is applied to the steel materials, the tool for friction stir welding itself is also exposed to a high temperature during joining. As a result, the tool for friction stir welding is plastically deformed, and a portion of the tool for friction stir welding that is in contact with the materials to be joined, and in particular a shoulder portion, is easily oxidized and expanded. If friction stir welding is continued, with the portion having been oxidized and expanded, there arises a problem that a burr is produced at the joint portion and the joining quality becomes worse, and a problem that the oxidized portion reaches a high temperature and falls off and wear of the shoulder portion tends to progress.

The friction stir welding processing is broadly divided into friction stir welding (FSW) and friction spot joining (spot FSW). In friction stir welding, the tool for friction stir welding is inserted into the materials to be joined and frictional heat is generated, and in this state, the materials to be joined are continuously joined. On the other hand, in friction spot joining, the tool for friction stir welding is moved away from the materials to be joined every two to three seconds, and the materials to be joined are intermittently joined. Therefore, in friction spot joining, the tool for friction stir welding comes into contact with the air whenever joining is performed, and thus, a surface of the tool for friction stir welding is exposed to the oxidation environment and is oxidized easily. As a result, shortening of the tool life is prominent.

Moreover, in friction spot joining, when the tool for friction stir welding is moved away from the materials to be joined, heat is released from the tool for friction stir welding to the air, and thus, the surface temperature of the tool for friction stir welding decreases temporarily. When the surface temperature of the tool for friction stir welding is low, plastic flow of the materials to be joined is less likely to occur.

Therefore, when the tool for friction stir welding is pressed against the materials to be joined, friction stirring must be performed under severer conditions such as, for example, at the increased rotation speed of the tool for friction stir welding or at the increased pressing force. It is needless to say that the use under such severe conditions is likely to cause damage to the tool for friction stir welding.

The present invention has been made in view of the above-mentioned circumstances, and an object of the present invention is to provide a tool for friction stir welding, in which the tool for friction stir welding itself does not reach a high temperature easily and materials to be joined reach a high temperature easily, thereby achieving excellent wear resistance and chipping resistance.

Solution to Problem

Conventionally, an attempt was made to prolong the life of the tool for friction stir welding exclusively through an approach of how to use a high-hardness material, such as using cemented carbide as a material for the base material to achieve high hardness or coating the base material with a high-hardness diamond coating.

The inventors of the present invention, however, judged that it was difficult to achieve the long life of the tool for friction stir welding through such a conventional approach, and studied various approaches through which the performance of the tool for friction stir welding can be enhanced based on parameters other than the material hardness. As a result of their study, using a new approach of reducing the thermal conductivity, not the conventional approach of heightening the material hardness to enhance the wear resistance of the material, the inventors of the present invention completed the tool for friction stir welding exhibiting excellent performance that cannot be achieved through the conventional method.

In other words, a tool for friction stir welding according to the present invention is used in friction stir welding processing, wherein the tool for friction stir welding includes a base material, the base material includes a first hard phase and a binder phase, and has a thermal conductivity of 45 W/m·K or less, the first hard phase is formed by WC particles, and the binder phase is formed by an iron group metal and is included in the base material at a volume ratio of 8% by volume or more and 28% by volume or less.

Preferably, the base material further includes a second hard phase, the second hard phase is formed by a compound of one or more metals selected from the group consisting of Ti, Zr, Hf, V, Nb, Ta, Cr, Mo, and W and one or more elements selected from the group consisting of nitrogen, carbon, boron, and oxygen, or a solid solution of the compound (except for WC), and a constituting ratio between the first hard phase and the second hard phase is such that the first hard phase is higher than the second hard phase in terms of volume ratio.

Preferably, the second hard phase is formed by carbide (except for WC), nitride or carbonitride of one or more metals selected from the group consisting of Ti, Zr, Hf, V, Nb, Ta, Cr, Mo, and W. Preferably, the base material includes the second hard phase at a volume ratio of 5% by volume or more and less than 46% by volume.

Preferably, a volume ratio of nitride and/or carbonitride to the second hard phase is 30% by volume or more and 100% by volume or less. Preferably, the WC particles have an average particle size of 2 μm or smaller.

When friction stir welding processing using the tool for friction stir welding is friction spot joining, the tool for friction stir welding can offer particularly excellent performance. Preferably, the tool for friction stir welding includes the base material and a coating layer formed on the base material. Preferably, the coating layer has oxidation resistance at 1000° C. or higher. Preferably, the base material includes the first hard phase at a volume ratio of 36% by volume or more and 87% by volume or less.

Advantageous Effects of Invention

Since the tool for friction stir welding according to the present invention has the above-mentioned configuration, the tool for friction stir welding does not reach a high temperature easily and the materials to be joined reach a high temperature easily, and thus, excellent wear resistance and chipping resistance can be achieved.

BRIEF DESCRIPTION OF DRAWINGS

FIG. 1 is a schematic cross-sectional view of a tool for friction stir welding according to the present invention.

DESCRIPTION OF EMBODIMENTS

The present invention will be described in more detail hereinafter.

<Tool for Friction Stir Welding>

A tool for friction stir welding according to the present invention is used in friction stir welding processing, wherein the tool for friction stir welding includes a base material, the base material includes a first hard phase and a binder phase, and has a thermal conductivity of 45 W/m·K or less, the first hard phase is formed by WC particles, and the binder phase is formed by an iron group metal and is included in the base material at a volume ratio of 8% by volume or more and 28% by volume or less. It is to be noted that the base material may include a second hard phase, other components and an inevitable impurity as compositions other than the first hard phase and the binder phase. The second hard phase will be described below.

The tool for friction stir welding according to the present invention as mentioned above can be usefully used in, for example, a friction stir welding (FSW) application, a friction spot joining (spot FSW) application and the like. In particular, the tool for friction stir welding according to the present invention can be very usefully used in the spot FSW application because the base material is excellent in oxidation resistance due to the above-mentioned configuration.

FIG. 1 is a schematic cross-sectional view of the tool for friction stir welding according to the present invention. As shown in FIG. 1, a tool 1 for friction stir welding according to the present invention is shaped to include a probe portion 2 having a small diameter (e.g., a diameter of 2 mm or more and 8 mm or less) and a cylindrical portion 3 having a large diameter (e.g., a diameter of 4 mm or more and 30 mm or less). When this is used for joining, probe portion 2 is rotated, with probe portion 2 inserted into or pressed against a joint portion of materials to be joined, and thereby the materials to be joined are joined. It is to be noted that a portion that comes into contact with the materials to be joined during joining processing is referred to as a shoulder portion.

In this case, in the friction stir welding application, probe portion 2 is pressed against or inserted into two materials to be joined that are stacked or butted in a line contact manner, and rotating probe portion 2 is moved linearly with respect to the stacked portion or the butted portion, and thereby the materials to be joined are joined. On the other hand, in the friction spot joining application, rotating probe portion 2 is pressed against a desired joint spot of two materials to be joined that are vertically stacked or butted, and rotation of probe portion 2 is continued at this location, and thereby the materials to be joined are joined.

According to the present invention, when the materials to be joined are joined using the tool for friction stir welding, joining can be performed on the materials to be joined having a melting point of 1000° C. or higher. Using the tool for friction stir welding according to the present invention, joining can also be performed on the materials to be joined having a melting point of 1000° C. or higher, which has been considered to be difficult conventionally. Moreover, the tool for friction stir welding according to the present invention can also be used in friction spot joining of these materials. Therefore, the tool for friction stir welding according to the present invention has very excellent industrial applicability.

As mentioned above, tool 1 for friction stir welding according to the present invention can be used in various applications, and particularly, can be suitably used for joining of high-tensile steel, for which the resistance welding method has been mainly used conventionally. In other words, in joining of high-tensile steel, tool 1 for friction stir welding according to the present invention provides an alternative to the conventional resistance welding method. In friction stir welding, the materials to be joined are joined in a solid-phase state and dynamic recrystallization occurs at the joint portion, and thus, the structure becomes fine. As a result, the strength of the joint portion can be increased as compared with the conventional resistance welding method in which the materials to be joined change into a liquid phase during joining. Therefore, the tool for friction stir welding according to the present invention can be very effectively used for joining of high-tensile steel having high specific strength, and in particular, joining of ultrahigh-tensile steel of 980 MPa or more. Moreover, even in friction spot joining of such ultrahigh-tensile steel, chipping of the tool for friction stir welding is less likely to occur. The tool for friction stir welding according to the present invention as mentioned above can be suitably used for joining of the materials to be joined that are made of a high-melting-point material. The tool for friction stir welding according to the present invention can also be used as a friction stir process.

<Base Material>

The base material used in the tool for friction stir welding according to the present invention includes the first hard phase formed by the WC particles, and the binder phase formed by the iron group metal, and has a thermal conductivity of 45 W/m·K or less. The thermal conductivity of 45 W/m·K or less can be achieved by inclusion, in the base material, of the binder phase at a volume ratio of 8% by volume or more and 28% by volume or less and/or the second hard phase formed by a compound of one or more metals selected from the group consisting of Ti, Zr, Hf, V, Nb, Ta, Cr, Mo, and W and one or more elements selected from the group consisting of nitrogen, carbon, boron, and oxygen, or a solid solution of the compound (except for WC). In particular, the WC particles forming the first hard phase preferably have an average particle size of 1 μm or smaller, and more preferably 0.5 μm or smaller. On the other hand, the volume ratio of the binder phase exceeding 28% by volume is not preferable because the oxidation resistance of the base material decreases. If the volume ratio of the binder phase is less than 8% by volume, the thermal conductivity of the base material exceeds 45 W/m·K, which is contrary to the desired objective.

Due to such a low thermal conductivity of the base material, frictional heat generated due to rotation of the tool for friction stir welding is not transmitted easily to the tool side and is conducted easily to the materials to be joined. Therefore, temperature rise of the materials to be joined can be promoted and plastic flow of the materials to be joined can occur in a short time. In addition, the heat is confined in the probe portion of the tool for friction stir welding and the heat is not conducted easily to the shoulder portion, and thus, oxidation is less likely to occur on a surface of the shoulder portion. Therefore, the oxidation resistance can be enhanced and the joining quality can also be enhanced.

Moreover, since the tool for friction stir welding has the low thermal conductivity, an amount of heat conducted to the materials to be joined increases.

Therefore, even under the mild joining conditions such as the reduced number of rotations or the reduced indentation load, the materials to be joined can be joined to the same degree as conventional joining, and thus, chipping of the tool for friction stir welding is less likely to occur. On the other hand, if the thermal conductivity exceeds 45 W/m·K, the frictional heat generated at the tool for friction stir welding is conducted to the tool side and the materials to be joined are less likely to reach a high temperature. Therefore, the time required for joining becomes longer.

For "thermal conductivity" herein, a value calculated based on a thermal diffusivity of the tool for friction stir welding obtained by measurement using a laser flash method as well as specific heat and density is employed. For the thermal diffusivity, a value obtained by measuring a sample size of φ8 mm×1.5 mm thick using a laser flash device (product name: Xenon Flash Analyzer LFA447 (manufactured by NETZSCH Inc.)) is employed.

The base material of the tool for friction stir welding according to the present invention may include free carbon or an abnormal phase called η phase in the structure thereof.

The base material includes the WC particles as the first hard phase, and preferably includes the WC particles at a volume ratio of 36% by volume or more and 87% by volume or less. As a result, the strength and the toughness of the tool for friction stir welding can be increased. If the WC particles are less than 36% by volume, the hardness and the toughness of the tool for friction stir welding decrease and chipping is likely to occur during joining processing. On the other hand, if the WC particles exceed 87% by volume, the chipping resistance of the tool for friction stir welding is likely to decrease.

<First Hard Phase>

In the present invention, the first hard phase included in the base material is formed by the WC particles, and the binder phase formed by the iron group metal combines the WC particles. The WC particles used for the first hard phase preferably have an average particle size of 2 μm or smaller, more preferably 0.7 μm or smaller, and still more preferably 0.5 μm or smaller. By decreasing the average particle size of the WC particles as described above, a contact area between the WC particles and a contact area between the WC particles and Co increase, and thus, the thermal conductivity of the base material can be reduced. As a result, the wear resistance and the joining quality of the shoulder portion can be enhanced.

For the average particle size of the WC particles, a value obtained by measurement as described below is employed.

First, using a scanning electron microscope (SEM) and electron probe micro-analysis (EPMA) included therewith, mapping is performed on the WC particles and the other components in a cross section of the tool for friction stir welding (plane perpendicular to a tip direction of the probe portion). Then, the number of the WC particles present on an arbitrary line segment of 20 μm in the cross section is counted and a total length of regions occupied by the WC particles on the line segment is measured. Next, a value obtained by dividing the total length thus measured by the number of the WC particles is defined as a particle size of the WC particles. Then, similar measurement is performed on three line segments as the arbitrary line segment, to obtain an average value of the particle sizes of the individual WC particles. The average value is defined as the average particle size of the WC particles.

<Second Hard Phase>

In the present invention, the base material preferably further includes the second hard phase. The second hard phase is included in the base material together with the first hard phase and has a composition exhibiting a heat insulating property. The second hard phase is formed by a compound of one or more metals selected from the group consisting of Ti, Zr, Hf, V, Nb, Ta, Cr, Mo, and W and one or more elements selected from the group consisting of nitrogen, carbon, boron, and oxygen, or a solid solution of the compound (except for WC). This compound or solid solution thereof is excellent in heat insulating property. Therefore, by inclusion in the base material, the thermal conductivity of the base material can be reduced.

The second hard phase is preferably formed by carbide (except for WC), nitride or carbonitride of one or more metals selected from the group consisting of Ti, Zr, Hf, V, Nb, Ta, Cr, Mo, and W. This is because these compounds are particularly excellent in oxidation resistance. An exemplary suitable composition of these compounds can include, for example, carbide, oxide, carbonitride or the like of $(Ti_{1-x}Al_x)$, $(Ti_{1-x}Cr_x)$, $(Ti_{1-x}Mo_x)$, $(Ti_{1-x}Zr_x)$, $(Ti_{1-x}Hf_x)$, or $(Ti_{1-x}Nb_x)$ (x represents any number not larger than 1) (a substance further including B, Cr or the like may also be included). In the above, an atomic ratio between oxygen and carbon is not particularly limited and any conventionally known atomic ratios can be employed.

More preferably, the second hard phase can include TiCN, TiN, MoC, TaC, NbC, ZrC, TiTaC, TaNbC, CrC, TiSiN, TiSiCN, TiHfN, TiNbC, TiAlN, TiAlCrN, TiAlSiN, TiAlSiCrN, TiBN, TiAlBN, TiSiBN, TiBCN, TiAlBCN, TiSiBCN, TiTaWC, WTiC, WTiTaCN, WTiNbCN and the like. In the present invention, when the atomic ratio is not particularly described, a conventionally known atomic ratio can be arbitrarily selected.

Preferably, a volume ratio of nitride and/or carbonitride to the second hard phase is 30% by volume or more and 100% by volume or less. Since the second hard phase includes nitride and/or carbonitride, the oxidation resistance of the tool for friction stir welding is enhanced, and thus, chipping of the tool for friction stir welding is less likely to occur. Moreover, since oxidation and expansion of a side surface of the shoulder portion of the base material are suppressed, a burr is also less likely to be produced at the joint portion of the materials to be joined, and thus, the joining quality of the materials to be joined is also enhanced.

More preferably, nitride and/or carbonitride included in the second hard phase can include TiN, ZrN, NbCN, TiCN, WTiC, WTiTaCN, WTiNbCN and the like. In the present invention, when the atomic ratio is not particularly described, a conventionally known atomic ratio can be arbitrarily selected.

<Constituting Ratio Between First Hard Phase and Second Hard Phase>

In the present invention, the base material includes the first hard phase and the second hard phase as mentioned above, and a constituting ratio between the first hard phase and the second hard phase is preferably such that the first hard phase is higher than the second hard phase in terms of volume ratio. In other words, it is preferable to include the second hard phase at a volume ratio lower than that of the first hard phase. Since the base material includes the second hard phase of the above-mentioned composition at a volume ratio lower than that of the first hard phase, the thermal conductivity of the tool for friction stir welding can be reduced, and thus, the wear resistance and the chipping resistance of the tool for friction stir welding can be enhanced. On the other hand, if the first hard phase is identical to or lower than the second hard phase in terms of volume ratio, the chipping resistance of the tool for friction stir welding decreases.

Preferably, the base material includes the second hard phase at a volume ratio of 5% by volume or more and less than 46% by volume. As a result, the oxidation resistance of the base material can be enhanced and the thermal conductivity can be set to be 45 W/m·K or less. If the second hard phase is less than 5% by volume, the effect of enhancing the oxidation resistance cannot be obtained sufficiently and the thermal conductivity is likely to exceed 45 W/m·K.

<Binder Phase>

In the present invention, the binder phase is included in the base material to combine the first hard phases, the second hard phases, or the first hard phase and the second hard phase. Any binder phase may be used as long as the binder phase is formed by the iron group metal. Co is preferably used as the binder phase that combines the first hard phases. Ni is preferably used as the binder phase that combines the second hard phases. A composition ratio when Co and Ni are used as the binder phase can be arbitrarily changed. It is to be noted that the material used for the binder phase is not limited only to Co and Ni. Fe can also be used, and a solid solution of the elements constituting the first hard phase and the second hard phase may also be used. Preferably, the base material includes the binder phase at a volume ratio of 8% by volume or more and 28% by volume or less. Less than 8% by volume of the binder phase is not preferable because the strength may be insufficient. If the binder phase exceeds 28% by volume, the volume ratio of the first hard phase or the second hard phase may decrease relatively and the properties such as hardness and plastic deformation resistance cannot be obtained sufficiently in some cases.

<Coating Layer>

A coating layer may be provided on the base material of tool 1 for friction stir welding according to the present invention. The coating layer herein may be formed of only one layer having a single composition, or may be formed of two or more layers having different compositions. Since such a coating layer is provided, the effect of enhancing the properties such as wear resistance, oxidation resistance, toughness, and coloring property for identifying a used probe can be given. Although the coating layer is preferably formed to coat the entire surface of the base material, the coating layer may not coat a part of the base material, or the coating layer may have a different configuration at any portion on the base material. In addition, the coating layer may coat only the shoulder portion where oxidation is the most significant.

Preferably, a material having a thermal expansion coefficient of $7\times10^{-6}$ or more and $9\times10^{-6}$ or less is used as a material for the coating layer. More preferably, the coating layer is formed by nitride of one or more metals selected from the group consisting of Ti, Al, Cr, Si, Hf, Zr, Mo, Nb, Ta, V, and W.

Furthermore, the coating layer preferably has oxidation resistance at 1000° C. or higher. "Having oxidation resistance at 1000° C. or higher" herein means that weight increase occurs at 1000° C. or higher as a result of evaluation of the coating layer in the atmosphere using a thermogravimetry/differential thermal analysis (TG/DTA) device. An exemplary suitable composition of the coating layer having such oxidation resistance can include AlTiSiN, AlCrN, TiZrSiN, CrTaN, HfWSiN, CrAlN and the like.

The coating layer according to the present invention is preferably formed by a physical vapor deposition method (PVD method). This is because a film forming process capable of forming a compound with high crystallinity is preferable to form the coating layer according to the present invention on the surface of the base material, and as a result of study of various film forming methods, the physical vapor deposition method was found to be most suitable for suppressing oxidation of the base material because the coating layer after film formation is dense and a crack is less likely to be produced in the coating layer. The physical vapor deposition method includes, for example, a sputtering method, an ion plating method and the like. Particularly when a cathode arc ion plating method with a high ionization rate of source element is used, metal or gas ion bombardment processing can be performed on the surface of the base material before forming the coating layer, and thus, adhesiveness between the coating layer and the base material is greatly enhanced. Therefore, the cathode arc ion plating method is preferable.

EXAMPLE

While the present invention will be described in more detail hereinafter with reference to Examples, the present invention is not limited thereto.

<Examples 1 to 18, Comparative Examples 1 and 2>

First, the WC particles forming the first hard phase, the material forming the second hard phase, and the material forming the binder phase were mixed at volume ratios described in Table 1 below, and thereby the mixed powder was obtained. WC particles having an average particle size of 0.1 µm, 0.3 µm, 0.5 µm, 0.7 µm, and 2 µm were used as the WC particles. In Example 1 and Comparative Examples 1 and 2, only the WC particles forming the first hard phase were used and the material forming the second hard phase was not mixed.

Ethanol was added to the above-mentioned mixed powder and the powder was stirred for seven hours by using an attritor. There was thus obtained slurry in which the material for the first hard phase, the material for the second hard phase, and the material for the binder phase were mixed. Then, the ethanol contained in this slurry was volatilized. A sintered body raw material was thus obtained.

This sintered body raw material was filled into a die made of cemented carbide and was monoaxially pressed at a pressure of 100 MPa. A press molded body was thus obtained. This press molded body was sintered in a vacuum at a temperature of 1450° C. for one hour. Thereafter, hot isostatic pressing (HIP) processing was performed for one hour under the conditions of 1400° C. and 1000 atm. The tool for friction stir welding in each Example was thus fabricated.

The tool for friction stir welding fabricated as described above has the shape as shown in FIG. 1, and has cylindrical portion 3 having a substantially cylindrical shape whose diameter is 8 mm and whose height is 30 mm, and probe portion 2 protruding concentrically with cylindrical portion 3 at a central portion of the tip of cylindrical portion 3. Probe portion 2 has a substantially cylindrical shape whose diameter is 4 mm and whose height is 1 mm.

In Examples 6 to 10, the tool for friction stir welding in each of Examples 6 and 8 to 10 was fabricated in accordance with the composition and the method similar to those in Example 7, except that the average particle size of the WC particles was different as shown in Table 1 from that in the tool for friction stir welding in Example 7.

The tool for friction stir welding in Example 12 was fabricated in accordance with the method similar to that in Example 15, except that 2% by volume out of 10% by volume of Co in the tool for friction stir welding in Example 15 was changed into Ni.

In Example 1, by increasing an amount of Co to 28% by volume and decreasing the average particle size of the WC particles to 0.1 µm, the thermal conductivity of 45 W/m·K or less was achieved.

The tool for friction stir welding according to the present invention in each of Examples 1 to 18 thus fabricated includes the base material, the base material includes the first hard phase and the binder phase, and has a thermal conductivity of 45 W/m·K or less, the first hard phase is formed by the WC particles, and the binder phase is formed by the iron group metal and is included in the base material at a volume ratio of 8% by volume or more and 28% by volume or less.

TABLE 1

| | first hard phase | | | second hard phase | | | |
| --- | --- | --- | --- | --- | --- | --- | --- |
| | composition (vol. %) | average particle size (µm) | binder phase composition (vol. %) | composition (vol. %) | total volume (vol. %) | nitride carbonitride (vol. %) | thermal conductivity (W/m · K) |
| Example 1 | 72 | 0.1 | Co(28) | — | — | — | 43 |
| Example 2 | 67 | 0.5 | Co(8) | TiC(15), NbC(10) | 25 | — | 43 |
| Example 3 | 50 | 0.5 | Co(10) | TiC(20), TiNbC(10), TaC(5), NbC(5) | 40 | — | 37 |
| Example 4 | 70 | 0.5 | Co(28) | VC(2) | 2 | — | 43 |
| Example 5 | 67 | 0.5 | Co(28) | ZrC(5) | 5 | — | 42 |
| Example 6 | 50 | 0.3 | Co(10) | TiN(10), TiC(27), $Cr_3C_2$(3) | 40 | 25 | 40 |
| Example 7 | 50 | 2.3 | Co(10) | TiN(10), TiC(27), $Cr_3C_2$(3) | 40 | 25 | 45 |

TABLE 1-continued

| | first hard phase | | | second hard phase | | | |
|---|---|---|---|---|---|---|---|
| | average composition (vol. %) | particle size (μm) | binder phase composition (vol. %) | composition (vol. %) | total volume (vol. %) | nitride carbonitride (vol. %) | thermal conductivity (W/m · K) |
| Example 8 | 50 | 0.5 | Co(10) | TiN(10), TiC(27), $Cr_3C_2$(3) | 40 | 25 | 40 |
| Example 9 | 50 | 0.7 | Co(10) | TiN(10), TiC(27), $Cr_3C_2$(3) | 40 | 25 | 41 |
| Example 10 | 50 | 2 | Co(10) | TiN(10), TiC(27), $Cr_3C_2$(3) | 40 | 25 | 43 |
| Example 11 | 50 | 0.5 | Co(10) | TiN(10), ZrN(2), TiNbC(18), TaC(10) | 40 | 30 | 41 |
| Example 12 | 50 | 0.5 | Co(8), Ni(2) | TaN(5), TiCN(25), NbCN(10) | 40 | 100 | 39 |
| Example 13 | 45 | 0.5 | Co(8) | TaN(5), TiCN(25), NbCN(10), TaCN(7) | 47 | 100 | 37 |
| Example 14 | 50 | 0.3 | Co(10) | TaN(5), TiCN(25), NbCN(10) | 40 | 100 | 36 |
| Example 15 | 50 | 2.3 | Co(10) | TaN(5), TiCN(25), NbCN(10) | 40 | 100 | 45 |
| Example 16 | 50 | 0.5 | Co(10) | TaN(5), TiCN(25), NbCN(10) | 40 | 100 | 39 |
| Example 17 | 50 | 0.7 | Co(10) | TaN(5), TiCN(25), NbCN(10) | 40 | 100 | 42 |
| Example 18 | 50 | 2 | Co(10) | TaN(5), TiCN(25), NbCN(10) | 40 | 100 | 44 |
| Comparative Example 1 | 97 | 0.5 | Co(3) | — | — | — | 81 |
| Comparative Example 2 | 67 | 0.5 | Co(33) | — | — | — | 44 |

The tool for friction stir welding in each Example and each Comparative Example obtained in the above was mirror polished. Then, a photograph of a crystalline structure of the tool for friction stir welding at an arbitrary region was taken at 10000× magnification by using the scanning electron microscope (SEM), and mapping was performed on the WC particles, carbide, carbonitride and nitride of the second hard phase, and the component of the binder phase in a cross section of the tool for friction stir welding (plane perpendicular to a tip direction of the probe portion) by using the electron probe micro-analysis (EPMA) included with the SEM. Then, on the 10000× photograph taken in the above, the components were checked and the WC particles, carbide, carbonitride and nitride of the second hard phase, and the binder phase were identified by using image processing software. A total area of each of the WC particles, carbide, carbonitride and nitride of the second hard phase, and the binder phase was calculated on the photograph, and a percentage of the ratio of each of the WC particles, the second hard phase and the binder phase occupied in the tool for friction stir welding in the photograph was calculated. As a result, the blend ratio of each raw material described above could be regarded as being identical to the volume ratio of each composition of the tool for friction stir welding obtained finally.

Next, in the cross section, the number of the WC particles present on an arbitrary line segment of 20 μm was counted and a total length of regions occupied by the WC particles on the line segment was measured. The WC particles were identified by discerning an element by the EPMA. A value obtained by dividing the total length thus measured by the number of the WC particles was defined as the particle size of the WC particles, and similar measurement was performed on three line segments as the arbitrary line segment. The average particle size of the WC particles was thus obtained.

In addition, the thermal conductivity of the tool for friction stir welding in each Example and each Comparative Example described above was calculated based on the thermal diffusivity obtained by measurement using the laser flash method as well as the specific heat and the density, and was indicated in the section "thermal conductivity" in Table 1. A value of the thermal diffusivity herein was obtained by measuring the measurement sample size of φ8 mm×1.5 mm thick using the laser flash device (Xenon Flash Analyzer LFA447 (manufactured by NETZSCH Inc.)).

<Evaluation of Tool for Friction Stir Welding>

Under the conditions shown in Table 2 below, 800 spots of friction spot joining (spot FSW) were performed using the tool for friction stir welding in each Example and each Comparative Example fabricated in the above.

TABLE 2

| | | evaluation of wear resistance |
|---|---|---|
| materials to be joined | material | high-tensile steel |
| | tensile strength (MPa) | 780 |
| | plate thickness (mm) | 9 |
| joining condition | number of rotations (r.p.m) | 1000 |
| | indentation speed (mm/sec) | 1.5 |
| | indentation depth (mm)*[1] | 1 |
| | indentation load (ton) | 0.5 |
| | processing time (sec) | 2 |
| | number of indentations | 800*[2] |

*[1]"Indentation depth" in Table 2 refers to a penetration depth of the probe tip.
*[2]In Examples 19 and 20, evaluation was made at the number of indentations of 2000.

In the above, after 800 spots of friction spot joining, the tool for friction stir welding was immersed in hydrochloric acid, and an adhesion matter that has adhered to the surface thereof was removed while heating the hydrochloric acid for 10 minutes, and inner diameters of the shoulder portion and the probe portion of the tool for friction stir welding were measured by using a vernier caliper. A difference between the inner diameter of the shoulder portion before friction spot joining and the inner diameter of the shoulder portion after friction spot joining as well as a difference between the inner diameter of the probe portion before friction spot joining and the inner diameter of the probe portion after friction spot joining were thus evaluated as an amount of wear, and were indicated in the section "amount of wear (mm)" in Table 3. Table 3 shows that as the amount of wear is smaller, the wear resistance is better.

TABLE 3

| | amount of wear (mm) | | |
|---|---|---|---|
| | probe portion | shoulder portion | height of burr (mm) |
| Example 1 | 0.76 | 0.86 | 4.86 |
| Example 2 | 0.81 | 0.57 | 3.16 |
| Example 3 | 0.74 | 0.42 | 2.27 |

TABLE 3-continued

|  | amount of wear (mm) | | height of burr (mm) |
|---|---|---|---|
|  | probe portion | shoulder portion | |
| Example 4 | 0.41 | 0.72 | 2.13 |
| Example 5 | 0.34 | 0.43 | 1.28 |
| Example 6 | 0.37 | 0.26 | 1.01 |
| Example 7 | 0.73 | 0.68 | 1.59 |
| Example 8 | 0.4 | 0.31 | 1.13 |
| Example 9 | 0.45 | 0.35 | 1.08 |
| Example 10 | 0.48 | 0.41 | 1.34 |
| Example 11 | 0.34 | 0.18 | 0.66 |
| Example 12 | 0.21 | 0.12 | 0.38 |
| Example 13 | 0.18 | 0.13 | 0.26 |
| Example 14 | 0.24 | 0.11 | 0.31 |
| Example 15 | 0.66 | 0.53 | 1.17 |
| Example 16 | 0.27 | 0.17 | 0.54 |
| Example 17 | 0.32 | 0.25 | 0.48 |
| Example 18 | 0.49 | 0.34 | 0.75 |
| Comparative Example 1 | 1.5 | 1.58 | 8.67 |
| Comparative Example 2 | 1.2 | 1.72 | 9.13 |

A height of a burr protruding most from the surface of the materials to be joined after joining was indicated in the section "height of burr" in Table 3. Table 3 shows that as the height of the burr is lower, the joining quality is better.

As is clear from Table 3, the amounts of wear at the probe portion and the shoulder portion were smaller in the tool for friction stir welding according to the present invention in each of Examples 1 to 18 than in the tool for friction stir welding in each of Comparative Examples 1 and 2. Therefore, enhancement of the wear resistance of the tool for friction stir welding was clearly seen. In addition, the height of the burr was lower in the tool for friction stir welding according to the present invention in each of Examples 1 to 18 than in the tool for friction stir welding in each of Comparative Examples 1 and 2. Therefore, enhancement of the joining quality of the tool for friction stir welding was clearly seen.

As for the tool for friction stir welding in Example 3, the thermal conductivity was reduced by increasing a content of the second hard phase, and the wear resistance at the shoulder portion and the joining quality were excellent. On the other hand, since a content of the WC particles was decreased, the amount of wear at the probe portion increased.

As for the tool for friction stir welding in Example 4, the thermal conductivity was reduced by increasing a content of Co, and the wear resistance at the probe portion was excellent. On the other hand, since the volume ratio of the second hard phase was low, the wear resistance at the shoulder portion and the joining quality were not greatly improved.

As for the tool for friction stir welding in Example 5, the second hard phase was increased to 5% by volume as compared with the tool for friction stir welding in Example 4, thereby enhancing the wear resistance at the shoulder portion and the joining quality.

As for the tool for friction stir welding in each of Examples 7, 11, 13, and 15, the second hard phase was formed by nitride and/or carbonitride, thereby enhancing the wear resistance at the shoulder portion and the joining quality. It was found that as a ratio of nitride and/or carbonitride was higher, the height of the burr was lower, and thus, the joining quality was enhanced.

The tool for friction stir welding in each of Examples 6 and 8 to 10 was identical to the tool for friction stir welding in Example 7, except that the average particle size of the WC particles was different. It was found from this result that as the average particle size of the WC particles was smaller, the thermal conductivity could be lower, and thus, the wear resistance and the joining quality could be enhanced.

Similarly, the tool for friction stir welding in each of Examples 14 and 16 to 18 was also identical to the tool for friction stir welding in Example 15, except that the average particle size of the WC particles was different. It was found from this result that as the average particle size of the WC particles was smaller, the thermal conductivity could be lower, and thus, the wear resistance and the joining quality could be enhanced.

The reason why the wear resistance and the joining quality of the tool for friction stir welding in Comparative Example 1 were not excellent is considered as follows: since the content of Co was low, the thermal conductivity increased. On the other hand, the reason why the wear resistance and the joining quality of the tool for friction stir welding in Comparative Example 2 were not excellent is considered as follows: since the content of Co was high, oxidation at the shoulder portion became intense.

Example 19

Using the physical vapor deposition method, a coating layer made of $Al_{0.6}Ti_{0.35}Si_{0.05}N$ and having a thickness of 3 µm was provided on the base material of the tool for friction stir welding in Example 15. The tool for friction stir welding in the present example was thus fabricated. In the coating layer made of $Al_{0.6}Ti_{0.35}Si_{0.05}N$, an oxidation start temperature is 1130° C.

Example 20

The tool for friction stir welding in the present example was fabricated in accordance with the method similar to that in Example 19, except that the composition of the coating layer in Example 19 was changed into $Ti_{0.5}Al_{0.5}N$. In the coating layer made of $Ti_{0.5}Al_{0.5}N$, an oxidation start temperature is 970° C.

Under the conditions shown in Table 2, 2000 spots of friction spot joining were performed on the tool for friction stir welding in each of Examples 19 and 20 fabricated in the above. The result is shown in Table 4.

TABLE 4

|  |  | amount of wear (mm) | | height of burr (mm) |
|---|---|---|---|---|
|  | coating layer | probe portion | shoulder portion | |
| Example 19 | $Al_{0.6}Ti_{0.35}Si_{0.05}N$ | 0.04 | 0.02 | 0.08 |
| Example 20 | $Ti_{0.5}Al_{0.5}N$ | 0.08 | 0.05 | 0.17 |

As is clear from the result shown in Table 4, the tool for friction stir welding coated with the coating layer like the tool for friction stir welding in each of Examples 19 and 20 exhibited more excellent wear resistance and oxidation resistance than the tool for friction stir welding in Example 15, and the height of the burr could also be reduced.

In addition, since the oxidation start temperature of the coating layer in Example 19 was higher than the oxidation start temperature of the coating layer in Example 20 and the oxidation start temperature exceeded 1000° C., the tool in Example 19 exhibited more excellent wear resistance than the tool in Example 20. On the other hand, since the oxidation start temperature of the coating layer in Example 20 was lower than 1000° C., the tool for friction stir welding in Example 20 was inferior in wear resistance to the tool for friction stir welding in Example 19.

While the embodiments and examples of the present invention have been described above, it is also originally intended to combine configurations of the above-mentioned embodiments and examples as appropriate.

It should be understood that the embodiments and examples disclosed herein are illustrative and not limitative in any respect. The scope of the present invention is defined by the terms of the claims, rather than the description above, and is intended to include any modifications within the scope and meaning equivalent to the terms of the claims.

Reference Signs List 1 tool for friction stir welding; 2 probe portion; 3 cylindrical portion.

The invention claimed is:

1. A tool for friction stir welding used in friction stir welding processing, wherein
said tool for friction stir welding includes a base material,
said base material includes a first hard phase, a second hard phase, and a binder phase, and has a thermal conductivity of 45 W/m·K or less,
said first hard phase is formed by WC particles,
said second hard phase is formed by a compound of one or more metals selected from the group consisting of Ti, Zr, Hf, V, Nb, Ta, Cr, Mo, and W and one or more elements selected from the group consisting of nitrogen, carbon, boron, and oxygen, or a solid solution of the compound (except for WC).
said binder phase is formed by an iron group metal and is included in said base material at a volume ratio of between 8% and 28% by volume,
a constituting ratio between said first hard phase and said second hard phase is such that said first hard phase is higher than said second hard phase in terms of volume ratio,
a volume ratio of nitride and/or carbonitride to said second hard phase is between 30% and 100% by volume, and
said base material includes said first hard phase at a volume ratio between 36% and 50% by volume.

2. The tool for friction stir welding according to claim 1, wherein
said second hard phase is formed by carbide (except for WC), nitride or carbonitride of one or more metals selected from the group consisting of Ti, Zr, Hf, V, Nb, Ta, Cr, Mo, and W.

3. The tool for friction stir welding according to claim 1, wherein
said base material includes the second hard phase at a volume ratio of between 5% and 46% by volume.

4. The tool for friction stir welding according to claim 1, wherein
said WC particles have an average particle size of 2 μm or smaller.

5. The tool for friction stir welding according to claim 1, wherein
friction stir welding processing using said tool for friction stir welding is friction spot joining.

6. The tool for friction stir welding according to claim 1, wherein
said tool for friction stir welding includes said base material and a coating layer formed on the base material.

7. The tool for friction stir welding according to claim 6, wherein
said coating layer has oxidation resistance at 1000° C. or higher.

* * * * *